(12) United States Patent
Vaughn

(10) Patent No.: US 6,503,472 B1
(45) Date of Patent: *Jan. 7, 2003

(54) METHOD FOR REMOVAL OF NITROGEN OXIDES FROM GASEOUS STREAMS BY CAYALYTIC CARBON IN THE PRESENCE OF AMMONIA

(75) Inventor: Robert H. Vaughn, Bethel Park, PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 479 days.

This patent is subject to a terminal disclaimer.

(21) Appl. No.: 09/078,796

(22) Filed: May 14, 1998

(51) Int. Cl.$^7$ .............................................. B01D 53/56
(52) U.S. Cl. .................................................. 423/239.1
(58) Field of Search .............................. 423/235, 239.1; 436/37; 502/180, 416, 418, 423

(56) References Cited

U.S. PATENT DOCUMENTS

| | | | | | |
|---|---|---|---|---|---|
| 3,961,020 | A | * | 6/1976 | Seki | 423/239.1 |
| 4,045,368 | A | * | 8/1977 | Katori et al. | 252/421 |
| 4,210,628 | A | * | 7/1980 | Ninomiya et al. | 423/239 |
| 4,855,116 | A | * | 8/1989 | Richter et al. | 423/239 |
| 5,356,849 | A | * | 10/1994 | Matviya et al. | 502/180 |
| 5,444,031 | A | * | 8/1995 | Hayden | 502/180 |
| 5,470,748 | A | * | 11/1995 | Hayden et al. | 436/37 |
| 5,504,050 | A | * | 4/1996 | Hayden | 502/180 |
| 5,670,124 | A | * | 9/1997 | Itoga et al. | 423/239.1 |

* cited by examiner

Primary Examiner—Stuart L. Hendrickson
(74) Attorney, Agent, or Firm—Cohen & Grigsby, P.C.

(57) ABSTRACT

An improved process is provided for the chemical conversion and removal of nitrogen oxides from gaseous streams containing a stoichiometric amount of ammonia by contacting a low temperature catalytically-active carbonaceous char with said gaseous stream. The invention provides for the use of a low temperature carbonaceous char capable of rapidly decomposing hydrogen peroxide in an aqueous solution.

12 Claims, No Drawings

METHOD FOR REMOVAL OF NITROGEN OXIDES FROM GASEOUS STREAMS BY CAYALYTIC CARBON IN THE PRESENCE OF AMMONIA

FIELD OF THE INVENTION

The present invention relates to a process for the chemical conversion and removal of nitrogen oxides from gaseous streams containing a stoichiometric amount of ammonia using a catalytic carbonaceous char.

BACKGROUND OF THE INVENTION

Nitrogen oxides are the by-products of combustion process such as fossil fuel fired industrial boilers, electric utility boilers, as well as automobiles. In recent years, the regulation of nitrogen oxides has become more stringent due to the effects of nitrogen oxides on the environment. Nitrogen oxides are considered precursors to acid rain and contribute to the formation of ozone and haze. Nitrogen oxide emissions have been controlled by low $NO_x$ burners as well as selective catalytic reduction (SCR). The use of carbonaceous materials for removal of nitrogen oxides has gained attention due to the possibility of reduced costs when compared to either SCR or low $NO_x$ burners.

The use of activated carbon and other carbon containing materials has been recognized in the literature as a viable process for removal of nitrogen oxides from various gas streams. Rubel et al. describe the use of activated carbon between temperatures of 25° C. and 125° C. where nitric oxide (NO) was converted to nitrogen dioxide (NO2) in the presence of oxygen and activated carbon.

Ninomiya et al., U.S. Pat. No. 4,210,628 describes the use of an oxidized activated carbon for the removal of nitrogen oxides in the presence gaseous ammonia at temperatures ranging from 110° C. to 350° C. The nitrogen oxides are converted to nitrogen under these conditions.

Jüngten et al. describe the use of active coke and activated carbon which are preoxidized and incorporate heteroatoms of nitrogen through the exposure of the oxidized material to ammonia at high temperature. The use of such materials is shown to enhance the removal of nitrogen oxides in the presence of the modified activated carbon.

Illán et al. describe the use of activated carbon containing transition metals such a chromium, iron, cobalt, nickel, and copper. The addition of transition metals enhances the ability of the activated carbon to catalytically remove nitrogen oxides from gaseous streams.

All of the prior art for improving the removal of nitrogen oxides from gaseous media has certain disadvantages, which make the process unattractive from a commercial standpoint. Chief among these is an inability to determine in a rapid and convenient manner the suitability of a char for such applications prior to its use, in particular the intrinsic catalytic activity of the char for nitrogen oxide conversion. As a result of this shortcoming, it is not possible to know or even to estimate during the preparation of a char the utility of the final product short of actual testing in the application itself. None of the measures of typical char properties, e.g. iodine number and apparent density, has ever shown a clear correlation with utility in these applications, although some are known to affect overall reaction rates, primarily as a result of mass transport effects. This can be seen more clearly when several chars possessing nearly identical physical properties are contacted with a given nitrogen oxide-containing process stream, yet show significantly different rates of nitrogen oxide conversion and removal.

Accordingly, it is the object of the present invention to provide an improved process for the catalytic chemical conversion and removal of nitrogen oxides in gaseous media by contacting said media with a carbonaceous char in which the intrinsic catalytic activity of the char is measured and known prior to use. It is further the object of the present invention to estimate the intrinsic catalytic activity of the char using a test which is relatively cheap, quick, and simple in its execution and fairly indicative of the suitability of the char for the intended application.

SUMMARY OF THE INVENTION

In general, the present invention comprises an improved process for the catalytic chemical conversion and removal of nitrogen oxides from gaseous streams containing a stoichiometric amount of ammonia by contacting such process streams with a carbonaceous char. The present invention provides for the use of a carbonaceous char, which can rapidly decompose hydrogen peroxide in aqueous solution. More specifically, the carbonaceous char is preferably the low temperature char described in U.S. Pat. No. 6,342,129, which is incorporated herein by reference. Surprisingly, when tested under conditions wherein those char properties known to affect nitrogen oxide conversion and removal are held nearly equivalent, e.g. under conditions of nearly equivalent apparent density and iodine number, the rate at which the char can decompose hydrogen peroxide has been found to provide a fair indication of the utility of the char for nitrogen oxide conversion and removal.

The rate of hydrogen peroxide decomposition is measured by the test described in U.S. Pat. No. 5,470,748 and is reported, except where noted, as the t-¾ time, measured in minutes. In the present invention it is found that chars having the highest utility for nitrogen oxide conversion and removal are those having t-¾ times of 15 minutes or less, preferably 10 minutes or less. Other advantages of the invention will become apparent from a perusal of the following detailed description of presently preferred embodiments.

PRESENTLY PREFERRED EMBODIMENTS

The advantage of the invention in illustrated by the following example. The example demonstrates the removal capabilities of several catalytically-active materials with similar properties other than catalytic activity.

EXAMPLE

Several activated carbon materials were exposed to an inlet gas with a 500 ppmV nitric oxide (NO), 450-550 ppmV ammonia, 7% by volume oxygen, 10% by volume carbon dioxide, 10% by volume water, and balance nitrogen at 130° C. The total gas flow rate was 15.7 actual liters per minute to give a contact time of 1.8 seconds with the activated carbon material. Samples of the effluent nitric oxide were analyzed after one hour of operation. The data show the material with the highest catalytic activity as measured by the t ¾ time at pH 7 exhibits the greatest percent reduction in the nitric oxide concentration. The data is shown in TABLE 1.

TABLE 1

| Sample | t-¾ Time (minutes) | Apparent Density (g/cc) | Maximum Nitric Oxide Conversion at Steady State |
|---|---|---|---|
| Catalytically Active | 2.4 | 0.49 | 62% |
| Catalytically Active | 4.1 | 0.50 | 56% |
| Catalytically Active | 5.1 | 0.50 | 44% |
| Catalytically Active | 9.4 | 0.52 | 38% |
| Activated Carbon | 16 | 0.48 | 28% |
| Activated Carbon | 38 | 0.52 | 27% |
| Activated Carbon | 52 | 0.51 | 24% |

While a presently preferred embodiment of the invention has been described, the invention may be otherwise embodied within the scope of the appended claims.

What is claimed is:

1. A process for the removal of nitrogen oxides from streams, comprising the step of contacting said stream with a catalysts in the presence of ammonia and oxygen wherein said catalyst consists of catalytically carbonaceous char having a t-¾ time less than about 15 minutes and being produced by the steps of (a) combining a nitrogen-containing material or materials with a carbon-containing material to produce a mixture, (b) carbonizing said mixture during or after said carbonization at temperatures less than 600° C., (c) oxidizing the carbonized mixture during or after said carbonization at temperatures less than 600° C., (d) increasing the temperature of the carbonized and oxidized mixture to above 600° C., and (e) exposing said char to temperatures above 600° C. to $H_2O$, $CO_2$, $O_2$ or combinations thereof.

2. A process of claim 1 including contacting the product of step (c) with a nitrogen-containing compound, said compound having at least one nitrogen containing functionality in which the nitrogen exhibits a formal oxidation number less than zero, during or before step (d).

3. A process for the removal of nitrogen oxides from streams, comprising the step of contacting said stream with a catalyst in the presence of ammonia and oxygen wherein said catalyst consists of catalytic carbonaceous char having a t-¾ time less than about 15 minutes and being produced by the steps consisting of (a) combining a nitrogen-containing material or materials with a carbon-containing material to produce a mixture, (b) carbonizing said mixture at temperatures less than 600° C., (c) oxidizing the carbonized mixture during or after said carbonization at temperatures less than 600° C., and (d) increasing the temperature of the carbonized and oxidized mixture to above 600° C.

4. A process of claim 3 or 1 wherein the t-¾ time of said catalytic carbonaceous char is less than about 10 minutes.

5. A process of claim 3 or 1 wherein the t-¾ time of said catalytic carbonaceous char is less than about 5 minutes.

6. A process of claim 3 or 1 wherein said streams are gaseous.

7. A process of claim 3 or 1 wherein said catalytic carbonaceous char is granular, pelleted, shaped, or powdered.

8. A process of claim 3 or 1 wherein said catalytic carbonaceous char formed, bonded, or otherwise incorporated into a unitized body.

9. A process of claim 3 or 1 wherein said catalytic carbonaceous char is a fiber, fabric, or cloth.

10. A process of claim 3 or 1 wherein said catalytic carbonaceous char is derived from any carbon-containing material.

11. A process of claim 3 or 1 wherein said catalytic carbonaceous char is activated carbon.

12. A process of claim 3 or 1 including contacting the product of step (c) with a nitrogen-containing compound, said compound having at least one nitrogen containing functionality in which the nitrogen exhibits a formal oxidation number of less than zero, during or before step (d).

* * * * *

UNITED STATES PATENT AND TRADEMARK OFFICE
CERTIFICATE OF CORRECTION

PATENT NO.   : 6,503,472 B1
DATED        : January 7, 2003
INVENTOR(S)  : Robert H. Vaughn It is certified that error appears in the above-identified patent and that said Letters Patent is hereby corrected as shown below:

Title page, Item [54] and Column 1, lines 1-4,
The Title should read -- METHOD FOR REMOVAL OF NITROGEN OXIDES FROM GASEOUS STREAMS BY CATALYTIC CARBON IN THE PRESENCE OF AMMONIA --

Signed and Sealed this

Twenty-second Day of April, 2003

JAMES E. ROGAN
*Director of the United States Patent and Trademark Office*